UNITED STATES PATENT OFFICE.

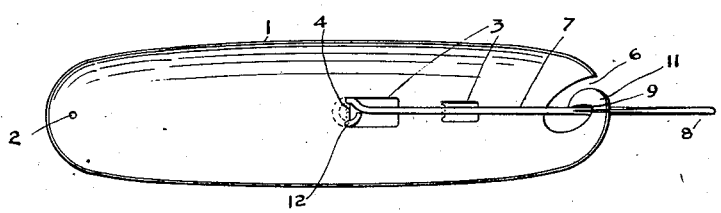
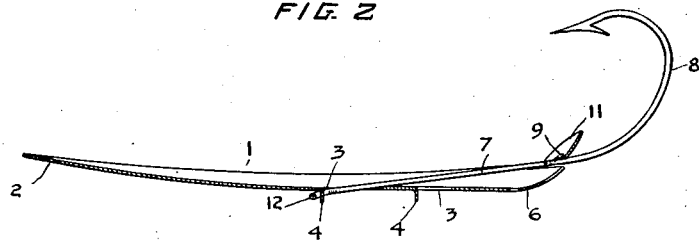
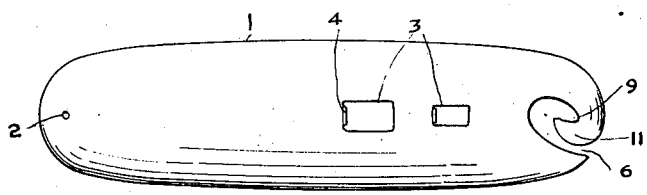

UTAKICHI KAWASAKI, OF SAN FRANCISCO, CALIFORNIA.

BAIT-SPOON.

1,290,571.

Specification of Letters Patent.  Patented Jan. 7, 1919.

Application filed May 8, 1918.  Serial No. 233,270.

*To all whom it may concern:*

Be it known that I, UTAKICHI KAWASAKI, a citizen of the United States, residing at San Francisco, in the county of San Francisco and State of California, have invented new and useful Improvements in Bait-Spoons, of which the following is a specification.

The object of the present invention is to provide a bait spoon for fishing to which a hook can be attached and from which it can be detached easily and with which hooks of different sizes can be used.

In the accompanying drawing, Figure 1 is a top plan view of my improved bait spoon, having a hook attached thereto; Fig. 2 is a longitudinal section thereof; Fig. 3 is a bottom plan view thereof, the hook being detached.

Referring to the drawing, 1 indicates a bait spoon of spring sheet metal and of a concavo-convex form in cross section and bent at the ends toward its concave side. The spoon has, at one end, a hole 2 for attachment to the fishing line, and near the other end a series of rectangular holes 3, two only being here shown. At the front end of each of the holes 3 the metal of the spoon is bent outward or toward the convex side of the spoon to form a lip 4. From the rear end of the spoon a portion is cut out and said cutaway portion is of such form as to provide a passage 6 for the shank 7 of the hook 8 and an opening 9 at the inner end of said passage to receive said shank in its final position, said opening being separated from said passage by a hook-shaped portion 11 of the spoon. To attach the hook 8 to the bait spoon, its eye 12 at the end of the shank remote from the barb is passed through said hole from the concave to the convex side of the spoon and is caused to engage the lip 4. The shank of the hook, which then is on the concave side of the spoon, is then moved toward said side until it engages its rear end. The operator now presses the shank of the hook firmly downward into said passage, said shank resisting this movement by reason of the engagement of the forward portion of said shank with the rear end of the rectangular aperture 3 through which its eye has been passed. To assist in securing the hook in position, at the same time that the shank is pressed downward into said passage, pressure is applied to the convex side of the hook-shaped portion 11 of the spoon to press it inwardly or in the opposite direction to that in which the shank of the hook is being pressed, and thus permit the shank to pass to the convex side of the hook-shaped portion 11 and then slip laterally into the opening 9 provided therefor.

The shank is now firmly held in position by the spring pressures of the hook-shaped portion 11 of the spoon and of the shank of the hook, which members press against each other and firmly resist any lateral movement of said shank tending to remove it from the opening 9.

When it is desired to remove the hook from the spoon a reverse operation is performed.

In practice the operation can be performed almost instantaneously.

I thus provide a bait spoon from which any hook can be removed, or on which one can be placed very quickly and easily, while at the same time the hook is very securely attached to the spoon.

I claim:—

A bait spoon of spring metal having an aperture and a lug extending outwardly from the front end of said aperture, said spoon having at its rear end a passage opening to its edge and an opening communicating with the inner end of said passage, said passage to the opening being of such form as to leave a rear portion of the spoon of a hook-shaped form, and a hook whose eye engages said lug and whose shank extends through and is held by the hook-shaped portion of the spoon.

UTAKICHI KAWASAKI.